United States Patent [19]

Lynn et al.

[11] Patent Number: 5,435,835
[45] Date of Patent: Jul. 25, 1995

[54] METHOD AND SYSTEM FOR REMOVING AND/OR CAUSING RECYCLING OF MATERIALS

[75] Inventors: John D. Lynn, Center Valley; Thomas H. Weidner, Allentown, both of Pa.; Elmer D. Anderson, II, Valparaiso, Ind.

[73] Assignee: Bethlehem Steel Corporation, Del.

[21] Appl. No.: 178,671

[22] Filed: Jan. 6, 1994

[51] Int. Cl.$^6$ ............................................. C21B 13/00
[52] U.S. Cl. ................................... 75/770; 75/765; 75/769; 75/772; 266/158; 266/178
[58] Field of Search ............... 75/770, 765, 772, 769; 266/158, 178

[56] References Cited

U.S. PATENT DOCUMENTS

| | | | |
|---|---|---|---|
| Re. 29,783 | 9/1978 | Smith et al. | 210/59 |
| 3,188,201 | 6/1965 | Sontheimer | 75/654 |
| 3,364,009 | 1/1968 | Kemmetmuller | . |
| 3,540,922 | 11/1970 | Brown et al. | 75/765 |
| 3,770,213 | 11/1973 | Lynn et al. | 241/24 |
| 3,791,595 | 2/1974 | Aubrey | 241/20 |
| 3,835,821 | 9/1974 | Lorenz et al. | 208/13 |
| 3,837,872 | 9/1974 | Conner | 106/74 |
| 3,948,644 | 4/1976 | Maurice | . |
| 4,018,679 | 4/1977 | Bolsing | 210/36 |
| 4,018,680 | 4/1977 | Kupfer | 210/50 |
| 4,028,240 | 6/1977 | Manchak | 210/59 |
| 4,069,315 | 1/1978 | Wagner et al. | 423/105 |
| 4,113,504 | 9/1978 | Chen et al. | 588/257 |
| 4,123,257 | 10/1978 | Fukuoka et al. | 75/772 |
| 4,124,405 | 11/1978 | Qulenot | 210/751 |
| 4,134,755 | 1/1979 | Meada | 75/25 |
| 4,209,335 | 6/1980 | Katayama et al. | 106/89 |
| 4,313,822 | 2/1982 | Cases | 75/654 |
| 4,350,597 | 9/1982 | Selm et al. | 210/710 |
| 4,376,043 | 3/1983 | Heijwegen et al. | 209/167 |
| 4,425,228 | 2/1984 | Lynn et al. | 209/167 |
| 4,432,666 | 2/1984 | Frey et al. | 405/129 |
| 4,434,060 | 4/1985 | Altmansberger et al. | 210/724 |
| 4,501,609 | 2/1985 | Druet | 75/769 |
| 4,509,986 | 4/1985 | Hooykaas | 106/110 |
| 4,514,307 | 4/1985 | Chestnut et al. | 210/751 |
| 4,661,243 | 4/1987 | Hotz | 209/10 |
| 4,670,161 | 6/1987 | Hayatdavoudl | 210/739 |
| 4,838,434 | 6/1989 | Miller et al. | 209/164 |
| 4,840,671 | 6/1989 | Lynn et al. | 106/85 |
| 4,889,640 | 12/1989 | Stanforth | 210/751 |
| 4,911,757 | 3/1990 | Lynn et al. | 106/85 |
| 4,960,525 | 10/1990 | Dalby et al. | 210/788 |
| 5,110,457 | 5/1992 | Krawl et al. | 210/787 |
| 5,137,599 | 8/1992 | Maxham | 162/5 |

FOREIGN PATENT DOCUMENTS

| | | |
|---|---|---|
| 51-086098 | 7/1976 | Japan . |
| 51-120903 | 10/1976 | Japan . |
| 52-009602 | 1/1977 | Japan . |
| 52-035703 | 3/1977 | Japan . |
| 53-81404 | 7/1978 | Japan . |
| 54-052695 | 4/1979 | Japan . |
| 55-028323 | 2/1980 | Japan . |
| 59-129738 | 7/1984 | Japan . |
| 1606191 | 11/1988 | U.S.S.R. . |

OTHER PUBLICATIONS

Waste Minimization And Management, T. H. Weldner, May 22, 1990 paper. pp. 1–5.
Recycling In The Steel Industry—An Overview, T. H. Weidner, 1989 paper pp. 1–8.
Management And Treatment Of Wastes For Recycling, T. H. Weidner, 1991 paper pp. 1–10.

*Primary Examiner*—Peter D. Rosenberg

[57] ABSTRACT

A system and process for treating dust and sludge from iron and steel making operations and includes separating iron and carbon from zinc and lead. Separation is performed in a series of hydrocyclones associated in a series-parallel fashion, The iron and carbon is recycled within the iron making operation without detriment to furnace liners, Lime and flocculent are added to the lead and zinc to create a stable material suitable for landfill disposal, Sludges are consumed by injection onto a sinter strand.

34 Claims, 3 Drawing Sheets

METHOD AND SYSTEM FOR REMOVING AND/OR CAUSING RECYCLING OF MATERIALS

CROSS-REFERENCE TO RELATED APPLICATIONS

This application is related to commonly assigned application Ser. No. 08/179,022, filed Jan. 7, 1994, of Elmer D. Anderson for the invention entitled METHOD AND APPARATUS FOR COMBUSTION OF STEEL PLANT WASTES.

1. Field of the Invention

The disclosed invention is directed to a method and system for treating and causing recycling of materials created in an integrated steel facility. More specifically, the disclosed invention is directed to treating and permitting reuse or disposal of waste materials accumulating or created from air and water treatment units of the steel plant.

2. Background of the Invention

This invention is directed to a system and method for treating iron and steel making reverts, i.e., dusts, particulates and sludges, to permit recycling of selected portions of the dusts and sludges while creating a stable, environmentally safe product from non-recyclable portions thereof.

Due to the integrated nature of a steel plant, treatment of the various streams must be consistent with operating criteria for the operating units and with environmental criteria, all the while seeking to maximize the recycling of economically valuable reverts and minimizing the disposal of materials which are not recyclable. Zinc, alkalis, water and particle size may create operational concerns, while lead, zinc and hydrocarbons may create environmental concerns. Treatment of any one of the streams without considering the resultant impact from the operational and environmental viewpoints can create other and potentially more significant problems elsewhere.

Alkalis, lead, zinc, iron, carbon, and organics in the by-products of iron and steel making operations create environmental challenges, as well as potential opportunities for recycling. Environmental legislation and regulation, plus the economics of recycling and disposal are causing steel makers to search for methods of minimizing the generation of wastes and maximizing the recovery of materials, such as by recycling iron and carbon.

As those skilled in the an appreciate, by-products of iron and steel making operations include reverts containing iron, carbon, impurities such as lead and zinc, and alkalis including potassium and sodium. The sludges may contain water, oils, and volatile organics.

Because the sludges contain undesirable amounts of organics, water, and residual metals, they have not heretofore been reclaimable nor recyclable, and have posed environmental disposal problems. Sludge has in the past been disposed in landfills, but many landfills are nearing capacity. In addition, an unlined landfill may permit the material to leach into the water table. Finally, while lined and capped landfills may minimize these problems consistent with environmental regulations, landfill storage is expensive, subject to long-term monitoring and regulation, and mounting public concern.

On the other hand, the reverts are potentially recyclable within the iron and steel making operations because they contain economically significant levels of iron and carbon. Unfortunately, the reverts also contain statistically significant levels of lead, zinc and hydrocarbons. Recycling of reverts without proper conditioning may lead to unacceptably high levels of lead and zinc in operations, such as in the blast furnace. Additionally, alkalis and zinc react with the refractory lining of the blast furnace, potentially causing premature failure and/or build-up of accretions on the lining which can choke off the furnace should the alkali/zinc level exceed operational limits. The iron and carbon content of the reverts can be economically significant, so that efficient separation of the iron and carbon from the lead, zinc, and other impurities within operational and environmental constraints is highly desirable.

The present invention is directed to a system and method for processing iron and steel making reverts in a manner which is economically efficient and environmentally safe. In addition, this treatment process can be incorporated in and/or retrofitted with existing operations at the steel plant in a manner which permits continued efficient operation of the facilities.

In addition, the disclosed invention treats the reverts and sludges generated in the water treatment of the blast furnace, steel making shop, and vacuum degasser, and at the waste water treatment facility as an integral whole. Thus, for example, separation of iron- and carbon-rich reverts from those rich in lead, zinc, and alkalis does not create either an operational or environmental problem at a downstream operating unit. Similarly, while the various sludges need to be separately treated, the non-recyclable portions may ultimately be combined in the course of being disposed of in an environmentally acceptable manner.

SUMMARY OF THE INVENTION

In general, this invention fulfills the above-described needs by processing blast furnace scrubber sludge (dust, particulates, and sludge) through a series of hydrocyclones. 80 to 90% of the iron and carbon is used in the sintering operation, while 80 to 90% of the zinc, lead, and alkalis is removed. The recovered iron and carbon are recycled to the iron making operations. The Pb- and Zn-containing overflow of the hydrocyclones is chemically stabilized for landfill disposal consistent with the Toxicity Characteristic Protocol specified by the Environmental Protection Agency.

More specifically, the invention is directed to a system for recycling and/or disposing of reverts and sludges generated in an integrated steel plant having a blast furnace unit, a steel making unit, a sintering unit, and a waste water treatment unit. At least a first separator is operably associated with an output stream of the blast furnace unit for separating reverts rich in iron and carbon from reverts rich in lead and zinc. A first assembly is operably associated with the steel making unit for conditioning reverts rich in iron. A raw material supply is operably associated with the first separator and the first assembly for receiving the iron and carbon rich reverts of the first separator and the iron rich reverts of the first assembly, and for thereby forming a sinter feed. Means are operably associated with the raw material supply for communicating the sinter feed to the sinter unit, so that the sinter feed may be transformed for recycling to the blast furnace unit. A slurry-making assembly is operably associated with an output stream of the waste water treatment unit for receiving generated sludge and creating a slurry therefrom. The slurry is pumped or otherwise communicated to the sinter unit for reuse therein.

The treatment and disposal of blast furnace dust and sludge comprises the steps of providing a mixture of particles comprised of iron, carbon, lead and zinc. The mixture is separated into a first stream rich in iron and carbon and a second stream rich in lead and zinc. The first stream is gravity fed to a horizontal belt filter for dewatering, and then transported by truck, belt, or otherwise to a bedding pile for preparation of a sinter plant feed. The particles in the second stream are conditioned through the addition of lime and flocculents, with the lead and zinc solids being removed from the water in a thickener. Lime is then added to chemically stabilize the lead and zinc. The stabilized material is dewatered and landfilled, and hardens into an impermeable mass. The clarified water is discharged to the steel plant's waste water treatment facility.

In preferred embodiments of the invention, a mixture of iron, carbon, lead, and zinc particles is separated by a plurality of hydrocyclones arranged in a two-stage series parallel fashion. In this arrangement, the underflow from the first and second stages of the hydrocyclones creates the first stream, and the overflow from the first stage hydrocyclones is input to the second stage hydrocyclones. The overflow from the second stage hydrocyclone is dewatered and chemically stabilized for disposal.

An overall system for the treatment and disposal of iron and steel making dusts and sludges comprises blast furnace filter cake reslurrying equipment, a plurality of separators for separating the slurry into fast and second streams, filtering equipment for dewatering the fast stream and creating a blast furnace feedstock, reactors for flocculating particles in the second stream, apparatus for adding lime to the second stream in order to chemically stabilize the material therein, and filtering equipment for dewatering the second stream. Reslurrying equipment may be provided to slurry sludge generated in the waste water treatment plant, and volatile organics in the slurry may be combusted in the sinter strand.

The disclosed invention permits essentially all of the wastes generated at an integrated steel plant to be either recycled or disposed of in an environmentally acceptable form. Those waste streams having materials, such as lead, zinc, and alkalis, which may create operational disturbances if accumulated to more than desired levels, are interrupted so that the materials may be selectively removed to assure an operationally acceptable feedstock, principally iron and carbon, for the blast furnace either directly or as sinter plant output. Other materials, such as volatile organics, sludges, and oily wastes, are separated from waste water streams in order to provide a clean outfall while causing the wastes to be disposed of either via combustion or through formation of an impermeable mass suitable for landfill disposal. In essence, rather than view each waste stream as an isolated problem, the solution of which may lead to a further and potentially more troublesome problem elsewhere, the invention considers the steel plant as an entirety and treats each waste stream not as a single problem but as one element in an overall problem.

BRIEF DESCRIPTION OF THE DRAWINGS

These and other objects and advantages of the invention will be readily apparent in view of the following description and drawings of the above-described invention.

DETAILED DESCRIPTION OF THE PREFERRED EMBODIMENT

An integrated steel plant usually has a coke works for transforming coal into coke, a blast furnace for making iron, and a BOF or melt shop for transforming iron into steel. Each facility creates wastes which must be collected to avoid contamination of the air and/or water. In addition, the BOF shop may employ a vacuum degasser which also collects particulate wastes.

The blast furnace, basic oxygen furnace, and vacuum degasser may have a wet scrubber, electrostatic precipitator, or a bag house in which particulates are collected to minimize air pollution. Should a wet scrubber be used, then a thickener dewaters the slurry, using flocculating chemicals so that further treatment, transportation, and storage may occur. The blast furnace likewise will have a thickener for concentration of particulates.

Each of the facilities uses water which may become contaminated with oils, greases, other hydrocarbons, and the like. Various treatment systems may be employed for the contaminated water, with secondary waste water treatment occurring to clarify the water and transform organic components into a sludge. As used herein, sludge means a suspension of a solid in a liquid. The waste water treatment plant sludge has different constituents and/or concentrations than the sludge produced at the blast furnace scrubber thickener, basic oxygen furnace thickener, and vacuum degasser thickener, so that treatment methodologies of each sludge must take these factors into account.

Lead containing reverts may be classified as a hazardous waste, so discharge of lead containing particulates into the air or water is controlled. Thus, while lead- and zinc-rich reverts may be collected in the blast furnace thickener sludge, recycling of this sludge may eventually cause an operationally unacceptable concentration of either or both zinc and lead in the blast furnace feedstock.

While organics in the plant water may be collected as a thickener sludge, landfill of the sludge creates a potential problem should environmental regulations change and/or the landfill no longer accept the waste. Because of their water content, sludges are a relatively high volume material. Moreover, the monitoring and reporting requirements for landfill use add costs of potentially indefinite duration.

Blast furnace scrubber sludge may contain, as a percentage of weight, approximately 20–35% iron, 35–45% carbon, 1–5% zinc, 0.1–0.5% lead, and 1–2% total alkalis. Sludge generated from the basic oxygen furnace is a very fine iron oxide containing high and variable mounts of zinc, ranging from 0.2–5% zinc. The secondary waste water treatment plant sludge may contain about 0.2% zinc and 0.03% lead on an oil-free dry basis, and about 20% O&G on a dry basis.

Figure 1:
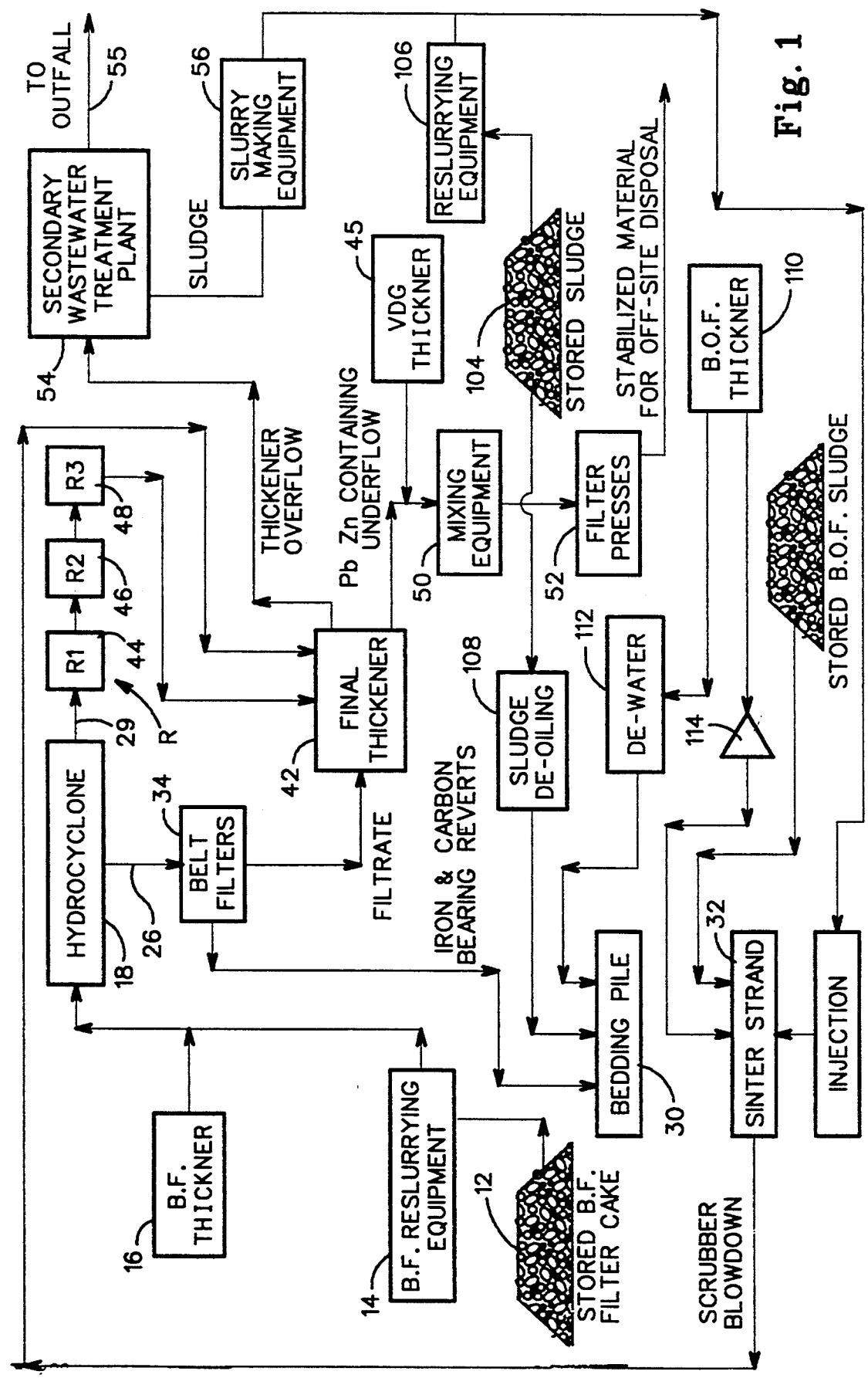
FIG. 1 is a block diagram of the process of the present invention.

The invention is illustrated in block form in FIG. 1, and removes up to 90% of the alkalis, lead, and zinc, while capturing for use as a raw material up to 90% of the reverts rich in iron and carbon in the blast furnace dust and sludge. In addition, the iron rich content of the basic oxygen furnace, if less than about 0.3% Zn, can be consumed as a raw material feedstock to the sinter strand. The hydrocarbons in the waste water treatment plant sludge, on the other hand, are combusted in the sinter strand burner hood and thereby consumed.

The iron- and carbon-rich underflow from the hydrocycloning process is suitable as a raw material for a sinter plant, thereby permitting recycling into the iron making operation. Because the zinc, lead, and alkalis are removed in the hydrocycloning process, then the addition of the reverts rich in iron and carbon may occur without significant reaction with the refractory lining of the blast furnace. The overflow from the hydrocycloning process, rich in alkalis, zinc, and lead, may be processed into a stable, impermeable product and disposed of in a landfill. The process illustrated in FIG. 1 is also capable of consuming, by injection onto the bed of the sinter strand, the sludges produced at the secondary waste water treatment plant (WWTP), while the sludge of the vacuum degasser may be combined with the lead, zinc, and alkali by-product of the hydrocycloning process for landfill disposal.

As best shown in FIG. 1, stored blast furnace filter cake 12 is reclaimed by a loader, belt feeder, or the like, and screened at ¼ inch size to remove oversized materials which may be fed directly to the hydrocyclone circuit 18. Water is added to produce a pumpable slurry at 14. The slurry pulp density is between a maximum of 45% by weight solids and a minimum of 15% by weight solids, and preferably is 30% by weight solids. The reslurrying equipment 14 is a rotating Trommel screen and high shear mixer. The underflow from the blast furnace thickener 16 from the wet scrubber (not shown) may be combined with the slurried filter cake as shown. The resulting slurry mix is diluted to between 5 and 20% solid, preferably 10% solid, and pumped at between 60 psig and 30 psig, preferably at 40 psig to the hydrocyclones.

We have found that the lead and zinc in the blast furnace thickener sludge is concentrated in the fine size fractions. This is probably due to a vaporization condensation process within the blast furnace, which tends to concentrate the metals on the highest surface area particles. This natural partitioning of lead and zinc about the fine iron and carbon reverts results in a simple means of size classification. To effectively beneficiate the material, however, a size separation at about 10 microns is required to preclude conventional screening operations.

Figure 2:
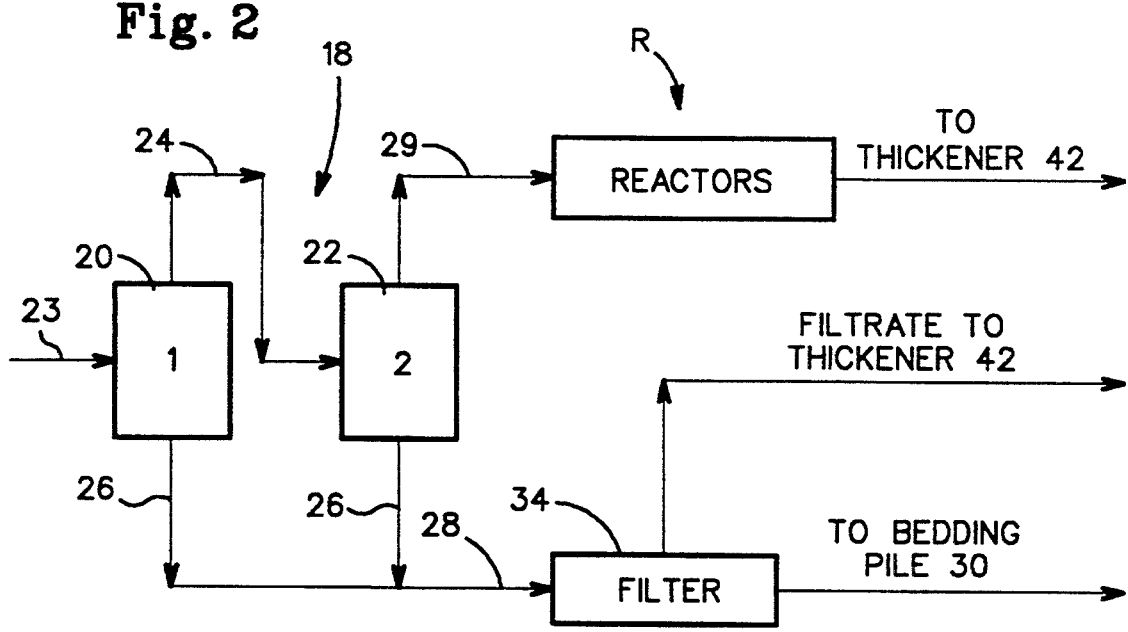
FIG. 2 is a schematic diagram of the two-stage series-parallel interconnection of the hydrocyclones of the present invention.

Hydrocyclones separate materials by size and mass. Hydrocycloning at 18 to separate the iron- and carbon-rich fraction of the pumped slurry from the lead- and zinc-rich fraction has been found to be advantageous because of the distinct size differences between the iron- and carbon-rich particles and the lead- and zinc-rich particles. Zinc and lead tend to condense onto the iron and carbon particles during the iron making operation of the blast furnace, so that due to surface area differences the weight percentage of lead and zinc in the fine particles exceeds the lead and zinc content of the relatively large particles. As best shown in FIG. 2, it is preferred that two hydrocyclones 20 and 22, or preferably banks of hydrocyclones, be connected in a two-stage series parallel configuration. First stage hydrocyclone 20 has an inlet 23 receiving the pumped slurry. The overflow 24 from first stage hydrocyclone 20 is the feed input to the second stage hydrocyclone 22, whereas the underflow 26 from the first and second stage hydrocyclones 20 and 22 discharges into discharge line 28. Thus, hydrocyclones 20 and 22 are arranged in a "series-parallel" configuration, with their overflows arranged serially and their underflows in parallel.

Small diameter hydrocyclones 20 and 22 operated at inlet pressures of two to three times that conventionally used in hydrocycloning operations, and lead and zinc rejections of 80 to 90% in the overflow and 80 to 90% recovery of iron and carbon in the underflow are achieved. Two-stage hydrocycloning yields improved iron and carbon recovery, with only minimal lead and zinc increase in the underflow. Two-stage hydrocycloning 18 involves primary hydrocycloning, followed by secondary hydrocycloning of the primary hydrocyclone overflow. The two underflow streams are combined to maximize iron and carbon recovery.

Hydrocyclones separate particles from a liquid as a function of various factors, including centrifugal speed of the material in the hydrocyclone, and we have found that the first stage hydrocyclone 20 makes a coarser size separation as contrasted with the size separation of second stage hydrocyclone 22. Thus, because the lead- and zinc-rich particles have a relatively smaller size than the carbon- and iron-rich particles, then the relatively larger carbon and iron particles are primarily separated at the hydrocyclone 20, with the lead and zinc being separated at the hydrocyclone 22 as overflow.

The preferred hydrocyclones have a 4 inch diameter, a 1¼ inch vortex finder, and a ⅜ inch apex. When these small diameter hydrocyclones are operated in the series parallel configuration of FIG. 2 and at inlet pressures which are typically two to three times that used in conventional hydrocycloning operations, approximately 40 psig as described above, lead and zinc rejection of up to 80 to 90% is achieved while iron and carbon recovery of up to 80 to 90% is achieved. Table 1 below presents the mass balance for the overflow and underflow of the hydrocycloning operation which has been achieved in pilot tests.

TABLE 1

HYDROCYCLONE TREATMENT OF
COMBINED BLAST FURNACE SLUDGE AND DUST

| | % Wt | T.A. | Fe | C | Zn | Pb |
|---|---|---|---|---|---|---|
| | | ANALYSES, % dry basis | | | | |
| H/C Feed | | 1.2 | 22 | 46 | 5.3 | 0.4 |
| H/C U'Flow | 70 | .4 | 31 | 59 | 0.7 | 0.1 |
| H/C O'Flow | 30 | 4.9 | 17 | 17 | 17.3 | 1.0 |
| | | % DISTRIBUTION | | | | |
| H/C U'Flow | | 19 | 81 | 89 | 9 | 10 |
| H/C O'Flow | | 81 | 19 | 11 | 91 | 90 |

The hydrocyclone underflow 26, rich in iron and carbon, is a semi-dewatered slurry having a relatively high settling velocity which may cream sanding problems in conventional bottom pickup vacuum filters. The underflow is fed through line 28 to a horizontal belt filter 34 where the slurry is dewatered, producing a filter cake containing approximately 15% water suitable for recycle to the sinter plant. Belt filter 34 is a horizontal belt/vacuum filter, such as the Eimco-Extractor ® available from EIMCO Process Equipment Company of Salt Lake City, Utah. Dewatering of the slurry is accomplished by the vacuum pumps (not shown) of the belt filter 34. Horizontal belt filter 34 has been found to eliminate the sanding problems associated with bottom pickup filters when filtering slurries containing coarse sized particles, about 1/16" in size.

Figure 3:
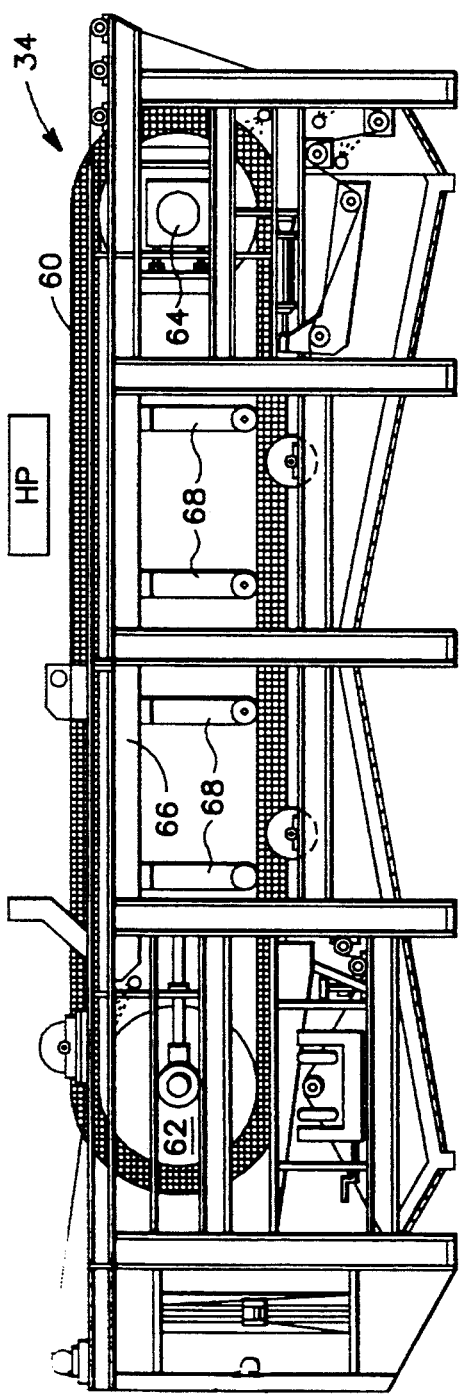
FIG. 3 is a fragmentary side elevational view of a belt filter used in the invention.

Filter 34, as best shown in FIG. 3, has a rotary filtering belt 60 stretching between rolls 62 and 64. Vacuum chamber 66 is disposed below belt 60 and applies a vacuum thereto by virtue of vacuum supply lines 68. Water extracted from the slurry on the belt 60 is removed from chamber 66 in conventional manner, and is essentially free of particulates rich in iron, carbon, lead, axed zinc, so that it may be discharged to thickener 42.

The iron and carbon bearing filter cake discharged from filter 34 can be delivered to a bedding pile 30. The bedding pile 30 is conventional, and provides a raw material feedstock to the sinter strand 32. The slurry, having been substantially dewatered to create a filter cake for ease of transport to and layering on the bedding pile 30, may then be sintered into clinkers suitable for use in the blast furnace. The filter cake does not significantly impact the moisture content of the bedding pile 30.

The overflow 29 from the hydrocyclone operation 18 contains extremely fine particles and a low solids concentration. Stabilization of the overflow from hydrocyclone operation 18 is attained by treatment with flocculents and stabilizing materials in reactors R1, R2, and R3. As best shown in FIG. 1, the overflow from hydrocyclone operation 18 is fed to serially arranged reactors 44, 46 and 48. Lime is added at first reactor 44 to develop a pH in the slurry of about 9.5. Approximately 5-10 ppm of a cationic polymer flocculent is added at second reactor 46, and the third reactor 48 adds approximately 1-2 ppm of an anionic polymer flocculent. Addition of the flocculents to the pH stabilized overflow thickens the slurry by causing the lead and zinc particles to coagulate. Those skilled in the art understand that flocculation is a process involving chemical addition prior to introduction of the mixture to a flocculation basin. The chemicals react with the process stream, and the reaction is rapid and may take place prior to introduction to the flocculation basin. The mixture is agitated gently in the basin, and the precipitate particles grow to a size facilitating sedimentation. As the particles grow, suspended particulate materials in the process stream collide with the floc, become enmeshed therein, and become part of the floe. The coagulated mixture from reactors R1, R2 and R3 is fed to final thickener 42 where flocculation occurs. Thickener 42 flocculates and concentrates the solids contained in the treated hydrocyclone overflow 29, the filtrate from belt filter 34, and the scrubber blowdown from sinter strand 32. A sludge blanket thickener may be used in place of or in conjunction with thickener 42.

Figure 4:
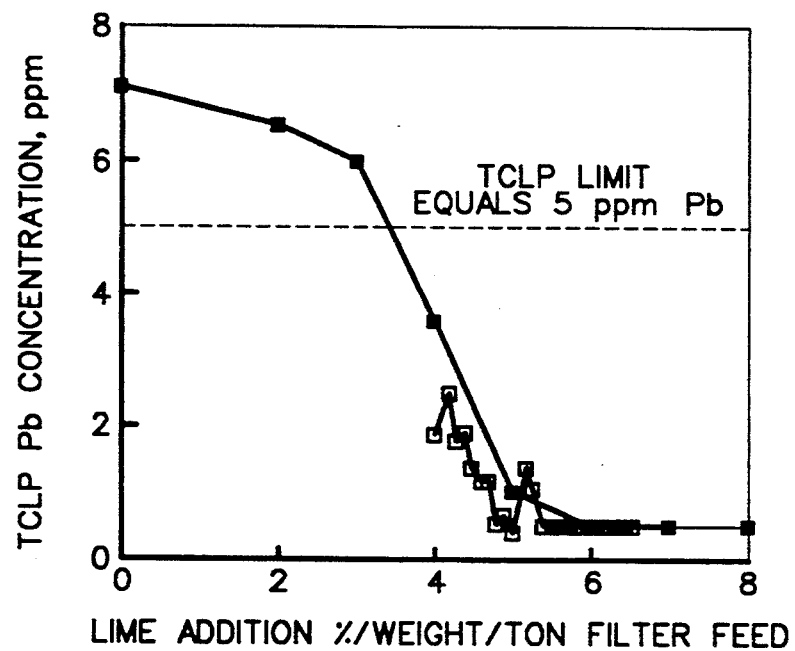
FIG. 4 is a graph of lime addition versus Pb concentration according to the TCLP.

The underflow from final thickener 42, rich in lead and zinc, is fed to lime buffering mixing station 50 where lime is added to chemically stabilize the material. A sludge solids-to-lime weight ratio of 17:1 and a mixing time of 5 minutes are preferred. In addition, thickened material rich in zinc and lead from vacuum degasser 45, sinter plant scrubber sludge, and similar in-plant wastes may be added at or for stabilization through lime station 50. The lead content in the underflow from thickener 42 is chemically stabilized by a lime addition of between about 4% to 8% by weight and preferably between about 4.7% and 6.6% based on the weight of the filter feed, as best shown in FIG. 4. The added lime should be burnt or hydrated lime having 65 to 70% available lime. The addition of lime beyond about 8% by weight will tend to resolubilize some metal hydroxides, and therefore should be avoided. Lime addition to the sludge within the noted ranges results in the formation of insoluble metal hydroxides, thereby inhibiting leaching of the, metals into the ground water after hardening. Because of the stable metal hydroxides, lead levels are maintained below the prescribed 5 ppm level using EPA prescribed TCLP testing.

The thickened and chemically stabilized mixture is dewatered in a recessed chamber plate and frame filter press 52, as best shown in FIG. 1. The filter cake is approximately 70 to 75% solids. The filter cake of filter press 52 is a compact mass exhibiting clay-like characteristics. Filtration at 100-225 psig inlet pressure, and a cycle time of 35 minutes (15 minutes filtration, 15 minutes high pressure squeeze at 225 psig, and 5 minutes air blow dry) results in a filter cake having 25-35% moisture and a clear filtrate with a pH of 12. Upon aging, the lead/zinc filter cake hardens, because of the formation of calcium carbonate, into an impermeable "mortar" which is environmentally stable. When fully dried, the metal hydroxides will not leach out of the mortar. The stabilized material passes the EPA's TCLP as a non-hazardous waste suitable for landfill disposal.

The overflow from thickener 42 is discharged to a secondary waste water treatment plant 54 ("WWTP") for further clarifying treatment. At WWTP 54, the thickener 42 overflow with other plant dirty water streams is treated to create a sludge, with separated water being discharged to the clean water outfall 55. In the past, the sludge has been landfilled. The sludge generated at the WWTP 54 is rich in hydrocarbons which will volatilize over a relatively wide-temperature range. Landfill of the sludge may be avoided by injection of the sludge onto the sinter strand 32 where it may be combusted.

Prior to injection onto the sinter strand 32, the WWTP sludge is reslurried in mixer 56 for pumping and spraying. The slurried sludge preferably has a solids content of 20 to 35% solids, preferably 35% solids. Prior to injection, the sludge slurry is screened at ⅛ inch to prevent plugging of the spray nozzles.

Figure 5:
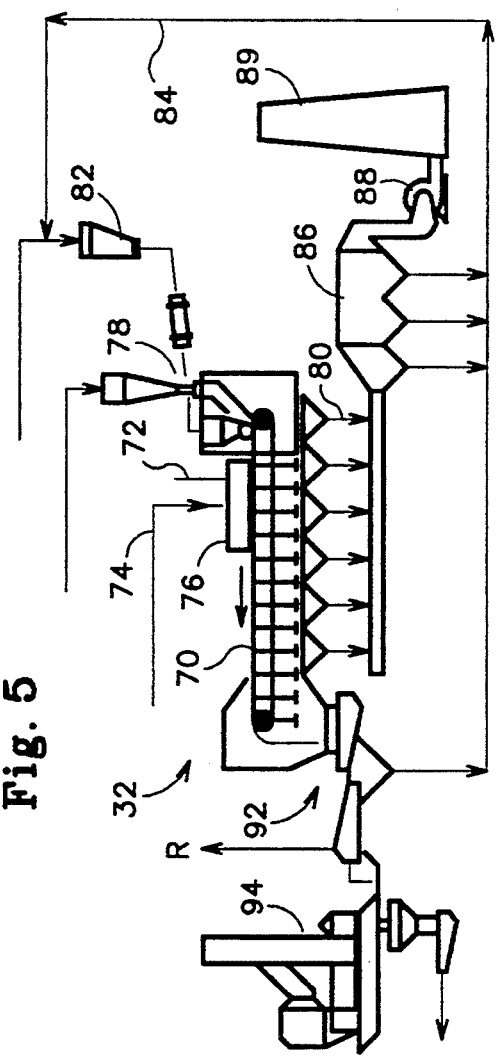
FIG. 5 is a schematic view of a sinter strand into which the sludge of the invention is injected.

As best shown in FIG. 5, the slurried sludge is sprayed onto the moving bed 70 of sinter strand 32, immediately downstream of ignition zone 72, at a pressure of between about 10 to 70 psig via feedline 74. Preheated air, as those skilled in the art understand, is injected into burner hood 76 downstream of raw material feed supply 78. A vacuum is typically applied to the moving bed 70 via vacuum lines 80 which collect fines, combustion gases, etc.; the fines may be recycled to hearth layer supply 82 through line 84. Vacuum lines 80 draw the preheated air, combustion products, and fines to electrostatic precipitator 86 by virtue of vacuum pump 88. Cleaned air is discharged through stack 89.

We have found that the slurried sludge injected onto the moving bed 70 downstream of the ignition zone 72 will be essentially completely combusted. The vacuum causes the atomized slurry to be drawn downward onto and through the moving bed 70, thereby providing sufficient residence time for the volatiles and other organics to be combusted. The strand 32 typically operates at a temperature of up to 2300° F., well above the combustion temperature of the components of the slurry. The slurried sludge is atomized so that the median volume diameter of the droplets is between 220 and 2500 microns. The water evaporates quickly, with the organics then being incinerated.

The mass of slurried sludge injected at 74 must take into account the speed of the bed 70, the temperature within burner hood 76, and the thickness of the sinter feed on the bed. The slurried sludge has a relatively high water content, so too much slurry could overly cool the bed and thereby adversely affect sinter quality or preclude complete combustion of the sprayed materials.

We prefer that the slurried sludge be injected onto the bed 70 after the sinter mix has already been ignited within burner hood 76, because this assures that highly volatile materials are combusted. The organics in the slurried sludge volatilize at different temperatures, so spraying the slurried sludge onto the sinter mix prior to ignition could permit the more volatile materials to be drawn in uncombusted form through the vacuum lines 80 to stack 89.

Figure 6:
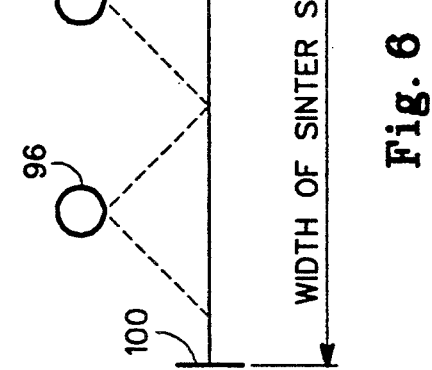
FIG. 6 is a schematic view of the configuration of nozzles for injecting sludge into the sinter strand.

Injection of the slurried sludge may be relatively easily accomplished without substantial alteration to the strand 32. The screens 92 and cooler 94 need not be affected, nor any of the other standard components of the strand 32. Injection is preferably through two spray nozzles 96 and 98, as best shown in FIG. 6, disposed internally within hood 76 and fed through line 74 originating with mixer 56. The nozzles 96 and 98 are stainless steel, V-jet nozzles with an 80° jet. A high alumina, zirconium oxide refractory lining providing resistance to the highly abrasive slurred sludge may line the nozzles. The refractory lining also provides temperature resistance, because nozzles 96 and 98 are within the high temperature environment of burner hood 76. Refractory nozzles may be used, because otherwise the coefficient of thermal expansion of the stainless steel forming the nozzles must be matched to that of the refractory material.

The nozzles 96 and 98, as best shown in FIG. 6, each has an 80° jet and they are laterally spaced to provide spray coverage over approximately 10 feet of the 12 foot wide strand. We prefer that the nozzles 96 and 98 spray the slurried sludge over a substantial portion of the width of bed 70, but not beyond lateral edges 100 and 102. Spraying the slurried sludge over the entire width of bed 70 will maximize the area available for combustion of the material. The sprays stop short of the lateral edges 100 and 102 in order to minimize the possibility of liquid going beyond the edges, and thereby being drawn in uncombusted form to vacuum lines 80.

As best shown in FIG. 1, existing stockpiles of stored sludge 104 may either be reslurried at 106 for injection onto sinter strand 32, or de-oiled at 108 and placed onto the bedding pile 30. De-oiling may be by solvent extraction using the SOLV-EX ® process from SRE, Inc., of Nutley, N.J.

Basic oxygen furnace thickener 110 has a sludge with a very fine iron oxide content and variable mounts of zinc. To be used as a feedstock for sinter strand 32, the zinc content should be 0.3% or lower and the moisture content should be about 10%. The zinc content of the fume is directly dependent upon the chemistry of the scrap charge. Consumption of the sludge from thickener 110 may be through a combination of slurry spraying into re-roll drum of strand 32 and/or filtering a mixture of burnt lime and sludge for addition directly to bedding pile 30.

The sludge from thickener 110 may be dewatered through pressure recessed chamber plate and frame filter press 112 prior to being added to bedding pile 30. The addition of about 2-5% burnt lime to the filter feed slurry produces a filter cake which is usable as a bedding pile feedstock. Additionally, the contained lime replaces some of the fluxstone addition in the sinter mix. The waste handling system of FIG. 1 assures that potentially deleterious amounts of lead, zinc, and alkalis are removed from a waste material stream in order to be safely disposed of by landfilling or otherwise. Economically valuable materials, such as carbon and iron, which are otherwise mixed with the deleterious materials, are separated therefrom and economically recycled to the blast furnace. Sludges, which previously have not been recyclable, may now be combusted and/or recycled. The system interrupts material streams in which deleterious and/or valuable materials are accumulating, and causes deleterious materials to be removed to operationally acceptable levels with the balance being chemically stabilized or otherwise treated for disposal, while economically valuable reverts are recycled for internal consumption.

While this invention has been described as having a preferred design, it is understood that it is capable of further modifications, uses and/or adaptations of the invention, following the general principle; of the invention and including such departures from the present disclosure as have come within known or customary practice in the an to which the invention pertains, and as may be applied to the central features hereinbefore set forth, and fall within the scope of the invention of the limits of the appended claims.

I claim:

1. A system for treating for recycling or other disposition reverts and sludges of an integrated steel plant having a blast furnace unit, a steel making unit, a sintering unit, and a waste water treatment unit, comprising:
    a) at least a first separator operably associated with an output stream of the blast furnace unit for separating reverts rich in iron and carbon from reverts rich in lead and zinc;
    b) at least a first assembly operably associated with the steel making unit for conditioning reverts received from the steel making unit rich in iron;
    c) a raw material supply operably associated with said first assembly and said first separator for receiving the iron- and carbon-rich reverts from said first separator and the iron-rich reverts from said first assembly and forming therefrom a sinter feed;
    d) means operably associated with said raw material supply for communicating the sinter feed to the sintering unit so that the sinter feed may thereby be transformed for recycling to the blast furnace unit;
    e) a slurry-making assembly operably associated with an output stream of the waste water treatment unit for receiving generated sludge and creating a slurry therefrom; and
    f) means operably connecting the slurry-making assembly with the sintering unit for communicating the slurry thereto for disposal therein.

2. The system of claim 1, wherein:
    a) said first separator includes at least one single stage hydrocyclone.

3. The system of claim 2, wherein:
a) said first separator includes lust and second hydrocyclones, the underflow of each hydrocyclone including the reverts rich in iron and carbon and the overflow of each hydrocyclone including the reverts rich in lead and zinc.

4. The system of claim 3, wherein:
a) the overflow from said first hydrocyclone is the input to said second hydrocyclone.

5. The system of claim 1, wherein:
a) said first assembly is one of a dewaterer and a mix and reroll drum.

6. The system of claim 1, wherein:
a) said slurry-making assembly includes a high shear mixer.

7. The system of claim 6, wherein:
a) said connecting means including a pump for supplying slurry under pressure to said sintering unit.

8. A method for treating iron making wastes, comprising the steps of:
a) providing a liquid mix comprising carbon, iron, lead, and zinc;
b) separating the mix into first and second streams, the first stream rich in iron and carbon and the second stream rich in lead and zinc;
c) separating the iron and carbon from the first stream;
d) flocculating particles in the second stream rich in zinc and lead;
e) separating the flocculated particles rich in lead and zinc from the liquid of the second stream;
f) forming a cementitious material from the flocculated particles rich in lead and zinc; and
g) permitting the cementitious material to harden.

9. The process of claim 8, including the step of:
a) forming the cementitious material by adding to the second stream between about 4% by weight to no more than 8.5% by weight of a basic material.

10. The process of claim 9, including the step of:
a) providing one of burnt and hydrated lime as the basic material, the lime having 65% to about 70% available lime.

11. The process of claim 9, including the step of:
a) adding from about 6% by weight to about 8% by weight lime as the basic material.

12. The process of claim 9, including the step of:
a) extracting a substantial portion of the liquid from the second stream after adding the basic material thereto.

13. The process of claim 8, including the step of:
a) flocculating the zinc- and lead-rich particles by adjusting the pH of the second stream to a level enhancing flocculation, and thereafter adding cationic and anionic flocculents to the second stream.

14. The process of claim 13, including the step of:
a) adjusting the pH of the second stream in a first reactor;
b) thereafter adding the cationic flocculent in a second reactor; and
c) thereafter adding the anionic flocculent in a third reactor.

15. The process of claim 14, including the step of:
a) feeding the output of the third reactor to a thickener, and
b) separating in the thickener flocculated zinc- and lead-rich flocculent from the liquid of the second stream.

16. The process of claim 15, including the step of:

a) adding from about 4% by weight to about 8½% by weight lime to the flocculent and thereby chemically stabilizing the flocculent.

17. The process of claim 16, including the step of:
a) separating the liquid from the flocculent through a plate and frame filter assembly.

18. The process of claim 8, including the step of:
a) separating particles rich in iron and carbon from the liquid of the first stream through operation of a horizontal belt filter.

19. The process of claim 18, including the step of:
a) combining the filtrate from the horizontal belt filter with the second stream.

20. The process of claim 18, including the steps of:
a) creating a slurry from the second stream after separating the flocculated lead and zinc particles therefrom; and
b) combusting volatile materials in the slurry.

21. The process of claim 18, including the step of:
a) creating from the second stream a slurry having a solids content of from about 20 to 35% by weight.

22. The process of claim 21, including the steps of:
a) providing a sinter strand having a combustion zone; and
b) spraying the slurry onto the sinter strand within the combustion zone.

23. The process of claim 22, including the step of:
a) drawing the slurry through the combustion zone of the sinter strand by application of a vacuum.

24. The process of claim 22, including the steps of:
a) providing at least two laterally spaced nozzles within the combustion zone; and
b) atomizing the slurry by spraying the slurry through the nozzles.

25. The process of claim 20, including the step of:
a) spraying the slurry over at least 80% of the width of the sinter strand.

26. A system for treating iron making wastes, comprising:
a) at least a first separator for classifying an input liquid stream into first and second streams, each stream rich in a preselected material;
b) a filter in fluid communication with said first separator for extracting from said first stream the selected material;
c) flocculation means in fluid communication with said first separator for causing the preselected material in said second stream to be flocculated;
d) thickener means in fluid communication with said flocculation means for separating a substantial portion of the liquid from the flocculated preselected material; of the second stream
e) means operably associated with said thickener means for adding a chemical stabilizer to the flocculated material; and
f) filter means in fluid communication with said adding means for separating liquid from the stabilized flocculated material.

27. The system of claim 26, wherein:
a) said first separator is a hydrocyclone system.

28. The system of claim 27, wherein:
a) said hydrocyclone system includes first and second hydrocyclones, each of said hydrocyclones having first and second outlets and said first hydrocyclone first outlet is in fluid communication with the input of said second hydrocyclone and said second outlets are in fluid communication.

29. The system of claim 28, wherein:

a) each of said hydrocyclones applying centrifugal forces to input material and said hydrocyclones causing the material to move at different speeds.

30. The system of claim 26, wherein:
a) said filter is a horizontal belt filter.

31. The system of claim 28, wherein:
a) said filter means is a plate and frame filter.

32. The system of claim 26, further comprising:
a) sludge forming means in fluid communication with said thickener means for transforming a substantial portion of the liquid of the second stream into a sludge; and b) combustion means operatively associated with said sludge forming means for causing combustion of the sludge.

33. The system of claim 30, wherein said combustion means includes:
a) a sinter strand assembly including a movable bed and an operatively associated burner hood.

34. The system of claim 30, wherein:
a) a vacuum system communicates with said burner hood for causing material therein to be drawn through said bed.

* * * * *

UNITED STATES PATENT AND TRADEMARK OFFICE
CERTIFICATE OF CORRECTION

PATENT NO. : 5,435,835
DATED : July 25, 1995
INVENTOR(S) : John D. Lynn, Thomas H. Weidner, and Elmer D. Anderson, II It is certified that error appears in the above-indentified patent and that said Letters Patent is hereby corrected as shown below:

Col. 1, line 48, "an" should read --art--.

Col. 2, lines 41 & 42, a new paragraph should not start at the word "alkalis".

Col. 3, line 27, "hydrocyclone" should read --hydrocyclones--.

Col. 3, lines 33 & 34, "fast" should read --first--, two times.

Col. 3, line 49, insert --g-- after disturbances.

Col. 5, line 44, "solid" should read --solids-- two times.

Col. 6, line 14, insert --are-- after "22".

Col. 6, line 65, "cream" should read --create--.

Col. 7, line 53, "floe" should read --floc--.

UNITED STATES PATENT AND TRADEMARK OFFICE
CERTIFICATE OF CORRECTION

PATENT NO. : 5,435,835
DATED : July 25, 1995
INVENTOR(S) : John D. Lynn, Thomas H. Weidner, and Elmer D. Anderson, II It is certified that error appears in the above-indentified patent and that said Letters Patent is hereby corrected as shown below:

Col. 10, line 34, "an" should read --art--.

Col. 11, line 2, "lust" should read --first--.

Signed and Sealed this

Twenty-third Day of January, 1996

*Attest:*

BRUCE LEHMAN

*Attesting Officer*     Commissioner of Patents and Trademarks

UNITED STATES PATENT AND TRADEMARK OFFICE
CERTIFICATE OF CORRECTION

PATENT NO. : 5,435,835
DATED : July 25, 1995
INVENTOR(S) : John D. Lynn, Thomas H. Weidner, and Elmer D. Anderson, II It is certified that error appears in the above-indentified patent and that said Letters Patent is hereby corrected as shown below:

Col. 3, line 27, "hydrocyclone" should read --hydrocyclones--.

Col. 3, line 49, insert --,-- after disturbances.

Col. 5, line 44, "solid" should read --solids-- two times.

Col. 6, line 14, insert --are-- after "22".

Signed and Sealed this

Twenty-sixth Day of March, 1996

Attest:

BRUCE LEHMAN

Attesting Officer  Commissioner of Patents and Trademarks